US012549202B1

(12) United States Patent
Hong et al.

(10) Patent No.: US 12,549,202 B1
(45) Date of Patent: Feb. 10, 2026

(54) DATA PROCESSING METHOD AND ELECTRONIC DEVICE

(71) Applicant: REBELLIONS INC., Seongnam-si (KR)

(72) Inventors: Boeui Hong, Seongnam-si (KR); Hyebin Jeong, Seongnam-si (KR); Sangjun Nam, Seongnam-si (KR); Jiun Yu, Seongnam-si (KR); Jaedon Lee, Seongnam-si (KR); Jungchul Park, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/022,819

(22) Filed: Jan. 15, 2025

(30) Foreign Application Priority Data

Oct. 17, 2024 (KR) .......................... 10-2024-0142292

(51) Int. Cl.
*H03M 13/11* (2006.01)

(52) U.S. Cl.
CPC ............................... *H03M 13/1174* (2013.01)

(58) Field of Classification Search
CPC ............... H03M 13/1174; H03M 13/19; G06F 11/1443; G06F 11/1476; G11C 29/42
See application file for complete search history.

(56) References Cited

U.S. PATENT DOCUMENTS

| 8,271,700 B1 | 9/2012 | Annem et al. |
| 2008/0301516 A1 | 12/2008 | Han et al. |
| 2014/0317479 A1* | 10/2014 | Candelaria .......... G06F 11/0727 714/807 |

FOREIGN PATENT DOCUMENTS

| CN | 114385407 | * | 4/2022 | ............ G06F 11/108 |
| KR | 10-2014-0142276 A | | 12/2014 | |
| KR | 10-2014-0144203 A | | 12/2014 | |
| KR | 10-2022-0081610 A | | 6/2022 | |
| KR | 10-2640910 B1 | | 2/2024 | |
| WO | WO-2004061687 A1 | * | 7/2004 | ............ G06F 13/28 |

OTHER PUBLICATIONS

Office Action for KR 10-2024-0142292 by Korean Intellectual Property Office dated Jan. 20, 2025.
Notice of Allowance for KR 10-2024-0142292 by Korean Intellectual Property Office dated Jul. 29, 2025.

* cited by examiner

*Primary Examiner* — Shelly A Chase
(74) *Attorney, Agent, or Firm* — BROADVIEW IP LAW, PC

(57) ABSTRACT

A data processing method using a plurality of devices for Artificial Intelligence (AI) task, the method comprising: transmitting transmission data including detection data, determining whether an error has occurred in the transmission data based on the detection data, and when the error has not occurred in the transmission data, performing an operation task based on the transmission data, wherein receiving side detection data is derived based on the transmission data, and whether the error has occurred in the transmission data is determined based on the receiving side detection data and the detection data included in the transmission data.

20 Claims, 12 Drawing Sheets

(a)

(b)

DATA PROCESSING METHOD AND ELECTRONIC DEVICE

CROSS REFERENCE TO RELATED APPLICATION

The present application claims priority to Korean Patent Application No. 10-2024-0142292, filed on Oct. 17, 2024, the entire contents of which is incorporated herein for all purposes by this reference.

TECHNICAL FIELD

The present disclosure relates to a data processing method and electronic device using detection data in AI task system.

BACKGROUND

As artificial intelligence (AI) technology advances, AI services utilizing it are becoming more widespread, and the size and complexity of data transmitted and inference work performed to support AI models such as LLM (Large Language Model) are increasing.

Accordingly, a system is proposed in which a plurality of devices process data for an operation task for AI inference in parallel, and due to an increase in operations for transmitting data between devices or between memories within a device within the system and an increase in complexity, data corruption problems caused by propagation of an error occurring in the middle and problems in making it difficult to identify the location of error occurrence may occur.

Accordingly, there is a need for a method or system that detects and corrects errors in communication operations between devices or DMA operations within a device to prevent data corruption or quickly detect a point where a problem occurs.

SUMMARY

An object of the present disclosure is to provide a data processing method and an electronic device that add detection data to transmission data of a DMA operation within a device or between devices, and detect errors in transmission data based on the detection data, in order to solve the problems.

In order to achieve the object, A data processing method according to an embodiment of the present disclosure includes: transmitting transmission data including detection data, determining whether an error has occurred in the transmission data based on the detection data, and when the error has not occurred in the transmission data, performing an operation task based on the transmission data, wherein receiving side detection data is derived based on the transmission data, and whether the error has occurred in the transmission data is determined based on the receiving side detection data and the detection data included in the transmission data.

A DMA method according to another embodiment of the present disclosure includes: deriving detection data of source data based on the source data in a source memory of a DMA operation, transferring the source data to a destination address in a destination memory by performing the DMA operation, deriving detection data of destination data based on the destination data transmitted to the destination address, and determining whether an error has occurred in the destination data based on the detection data of the destination data.

According to an embodiment of the present disclosure, it is possible to accurately detect a communication point or device where an error has occurred in a process of transmitting data for AI tasks, thereby obtaining an effect of efficiently resolving a data corruption problem.

According to an embodiment of the present disclosure, by detecting a communication point or device where an error has occurred in the process of transmitting data, the communication point or device where an error has occurred in the AI task system may be replaced or corrected, thereby improving an efficiency of fault diagnosis of the AI task system for AI tasks.

According to an embodiment of the present disclosure, by correcting transmission data in which an error has occurred, data corruption may be prevented, thereby improving the stability of data processing for AI tasks.

According to an embodiment of the present disclosure, it is possible to detect an operation or device in which an error has occurred in DMA operation within a device for AI tasks, thereby improving the stability and maintenance efficiency of the device.

DETAILED DESCRIPTION

Figure 1:
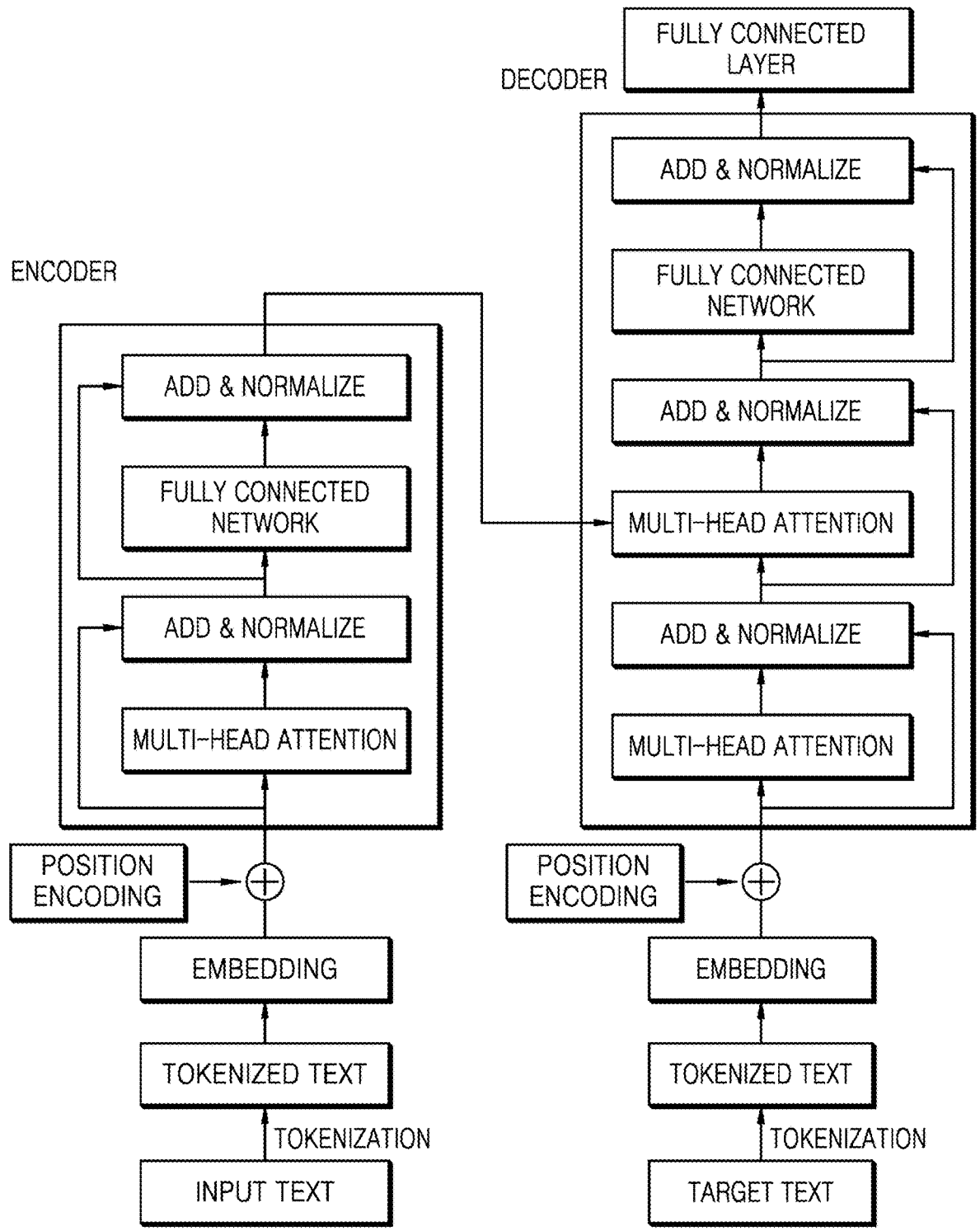
FIG. 1 is an exemplary block diagram illustrating a neural network application in encoder-decoder format according to an embodiment of the present disclosure.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as "circuit (circuitry)" may refer to a circuit in hardware, but may also refer to a circuit in software. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, "processor" may refer to an application-specific integrated circuit (ASIC), a programmable logic device (PLD), or a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, and so on. The memory is said to be in electronic communication with a processor if the processor can read information from and/or write information to the memory. The memory integrated with the processor is in electronic communication with the processor.

In the present disclosure, "each of a plurality of A" may refer to each of all components included in the plurality of A, or may refer to each of some of the components included in a plurality of A.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In addition, in the following examples, "determining whether it is less than" or "if it is less than" are disclosed, but "determining whether it is less than or equal to" or "if it is less than or equal to" may also be applied to the examples.

Before describing various examples of the present disclosure, terms used herein will be explained.

In the present disclosure, "instruction" may refer to a series of computer-readable commands grouped based on function, which are components of a computer program and executed by a processor.

In the present disclosure, "network" may be implemented as a wired network such as a Local Area Network (LAN), a Wide Area Network (WAN), or a Value Added Network (VAN), or any type of wireless network such as a mobile radio communication network or a satellite communication network.

According to an embodiment of the present disclosure, a language model (LM) may mean a model learned to output statistically the most appropriate output based on an input value (natural language, for example, a user's sentence). In addition, a large language model (LLM) may mean a large language model having parameters ranging from several tens of billions to several hundred billion. LLM may achieve much better performance in various fields of natural language processing, including translation and summarization, than existing small-scale language models.

For example, a LLM may be a neural network application that operates in an encoder-decoder format.

FIG. 1 is an exemplary block diagram illustrating a neural network application in encoder-decoder format according to an embodiment of the present disclosure.

Referring to FIG. 1, the input text may first be tokenized into individual word tokens, and may be encoded through an embedding layer before being input to an encoder. Then, an output value may be derived by adding a positional encoding vector to each embedded word, and the output value may pass through a multi head self-attention layer. Here, the output value may be called embedding. The multi head self-attention layer may be followed by an add & normalize step that performs layer normalization and adds original embedding through skip connections. Finally, the embedding derived through the add & normalize step may be fed into a "fully connected layer", which is a small multilayer perceptron consisting of two fully connected layers with a nonlinear activation function in between, and then the output embedding may go through the add & normalize step again before being passed to the multi head self-attention of the decoder stage.

Referring to FIG. 1, a decoder of the neural network application is similar to the encoder in overall structure, but differs in that the input and output are different. The encoder of the neural network application may receive input text to be processed, such as translation or summary, and the decoder may generate text on which the processing, such as translation or summary, has been performed.

In addition, for example, the process of generating a word by a decoder may be called a decoding step. In an electronic device performing LLM, when performing a specific decoding step, previously used data may be cached and reused. In order to cache and reuse the previously used data, direct memory access (DMA) may be performed in the electronic device. For example, DMA may mean a function of directly accessing memory such as RAM or a storage device without going through a processing of the CPU in a peripheral device of the device to obtain necessary data.

Meanwhile, a task of performing the LLM may be referred to as an LLM task, an AI operation task, or an AI task.

Figure 2:
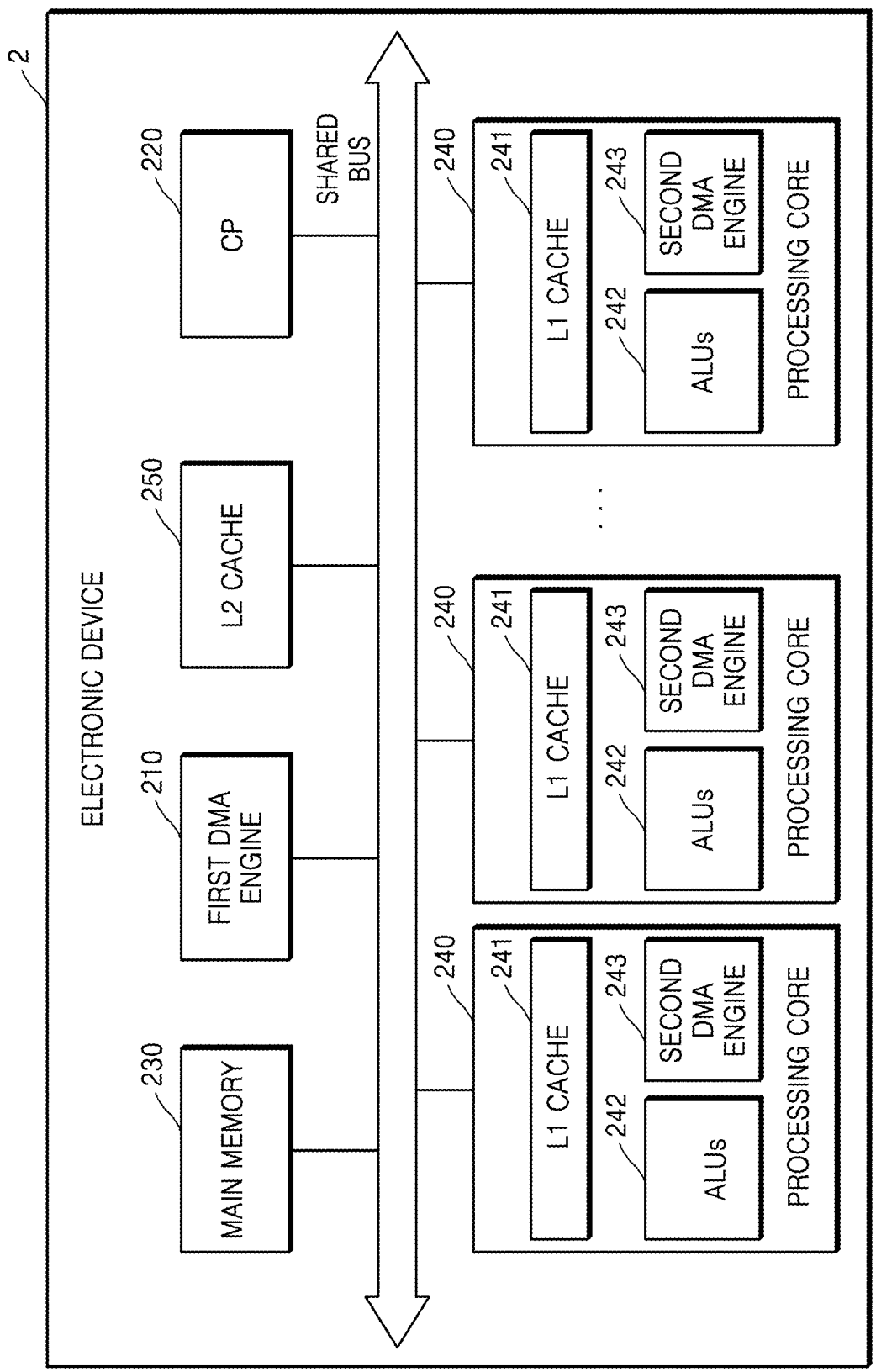
FIG. 2 is an exemplary block diagram illustrating an electronic device performing an LLM task according to an embodiment of the present disclosure.

FIG. 2 is an exemplary block diagram illustrating an electronic device performing an LLM task according to an embodiment of the present disclosure.

Referring to FIG. 2, an electronic device (2) according to an embodiment of the present disclosure may include a first DMA engine (210), a command processor (CP) (220), a main memory (230), at least one processing core (240) and/or an L2 cache (250). Here, the processing core (240) may be composed of an L1 cache (241), Arithmetic Logic Units (ALUs) (242) and/or a second DMA engine (243). In addition, the processing core (240) may include an internal buffer. The processing core (240) may be a processing device for processing an AI workload.

The first DMA engine (210) of FIG. 2 may be positioned externally, separately from the processing core (240), and the second DMA engine (243) may be positioned within the processing core (240).

In addition, for example, a capacity of a memory may be configured in the order of the main memory (230), L2 cache (250), and L1 cache (241). That is, the main memory (230) may be the memory with the highest capacity, the L2 cache (250) may be a memory with a capacity smaller than the main memory (230) but larger than the L1 cache (241), and the L1 cache (241) may be a memory with a capacity smaller than the main memory (230) and the L2 cache (250). For example, the main memory (230) may be a DRAM (Dynamic Random Access Memory), the L1 cache (241) and the L2 cache (250) may be SRAM (Static Random Access Memory), and the L1 cache (241) and the L2 cache (250) may be read/written faster than the main memory (230).

The main memory (230) and the L2 cache (250) may communicate using a shared bus. In addition, the main memory (230) and the L1 cache (241) of the processing core (240), and the L2 cache (250) and the L1 cache (241) of the processing core (240) may also communicate using the shared bus. In addition, the main memory (230) and the internal buffer of the processing core (240) may also communicate using the shared bus.

For example, in the electronic device, direct memory access (DMA) may be performed to cache and reuse previously used data in order to perform an operation task. For example, DMA may mean a function of directly accessing memory such as RAM or a storage device without going through a processing of the CPU in a peripheral device of the device to obtain necessary data. In addition, the operation task that operates the DMA may be expressed as a task.

For example, data of a certain size may be moved from the main memory (230) to the L2 cache (250) and/or the L1 cache (241). If it is necessary to move some of the data included in the main memory (230), the DMA may be used. That is, if it is necessary to move some of the data included in the main memory (230), the DMA operation may be performed.

In addition, since data located in the main memory (230) with a high capacity must be updated again after data processing for the operation task is completed, the DMA may be used. For example, data in memory space of the L2 cache (250) and/or the L1 cache (241) may be moved to memory space of the main memory (230).

For example, CP (220) may operate firmware for the DMA operation. For example, a host of the DMA operation connected to CP (220) may include general purpose CPUs, and may generate a task and/or subtask for the DMA operation based on a control signal received from the host, and may transmit the generated task and/or subtask to the DMA engine.

Figure 3A:
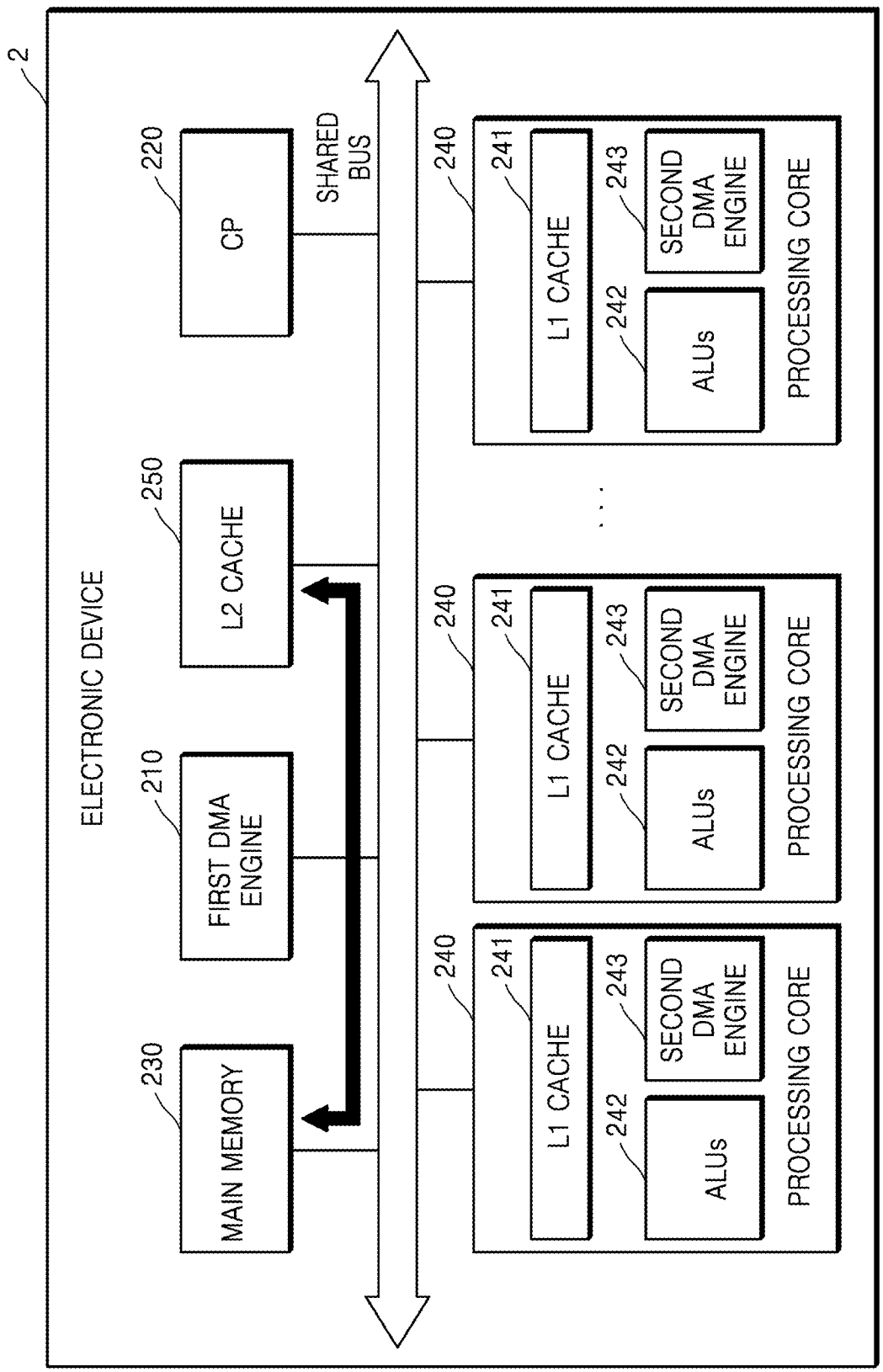
FIGS. 3A and 3B are exemplary block diagrams illustrating DMA performed in the electronic device in an embodiment of the present disclosure.
Figure 3B:
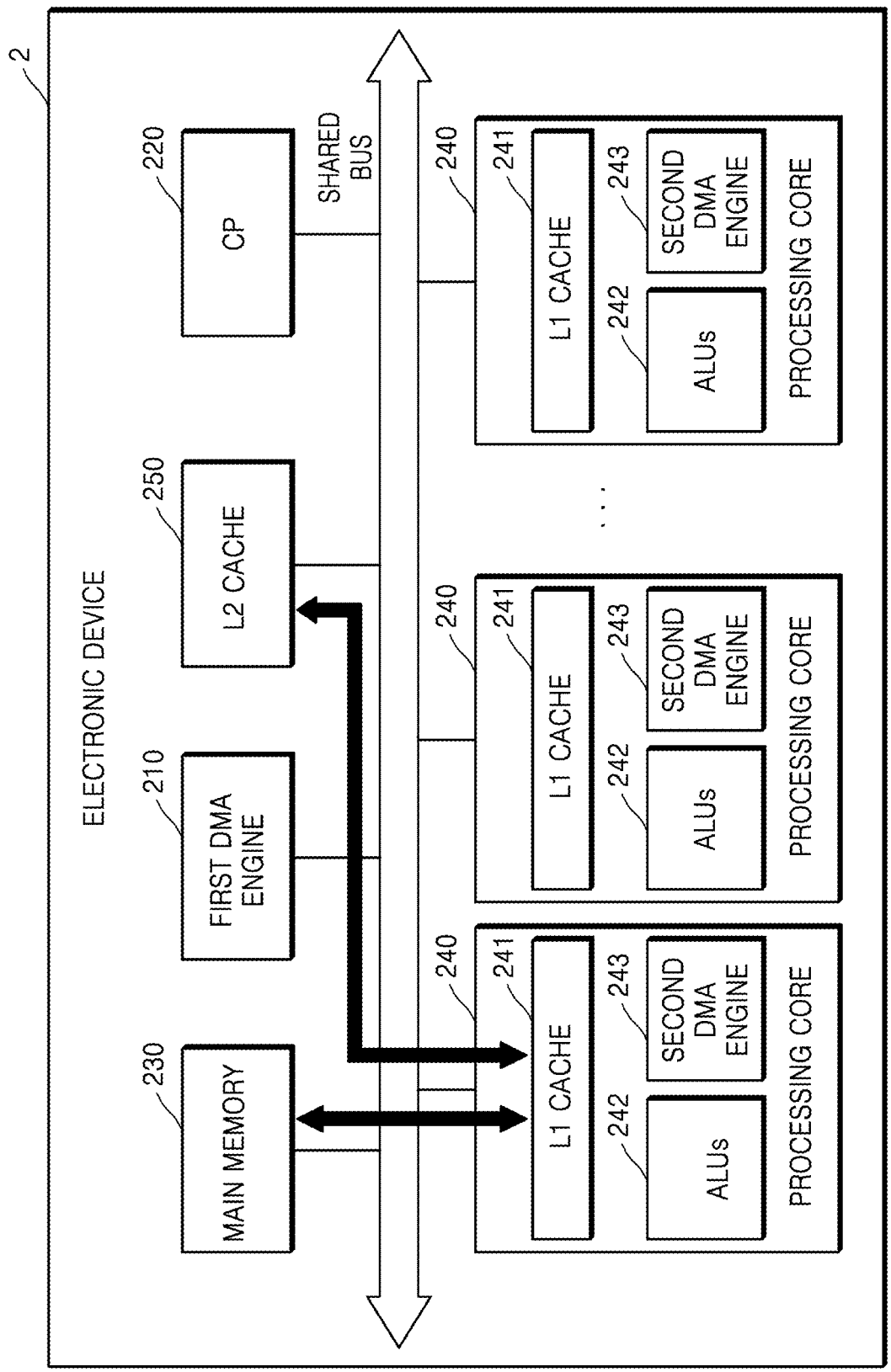

FIGS. 3A and 3B are exemplary block diagrams illustrating DMA performed in the electronic device in an embodiment of the present disclosure.

For example, referring to FIG. 3A, the first DMA engine (210) may perform bidirectional data transmission between the main memory (230) and the L2 cache (250).

For example, the first DMA engine (210) may perform a DMA operation to transmit data in the memory space of the main memory (230) to the memory space of the L2 cache (250). The first DMA engine (210) may transmit data in the memory space of the main memory (230) to the memory space of the L2 cache (250). In addition, for example, the first DMA engine (210) may perform a DMA operation to transmit data in the memory space of the L2 cache (250) to the memory space of the main memory (230). The first DMA engine (210) may transmit data in the memory space of the L2 cache (250) to the memory space of the main memory (230).

In addition, for example, referring to FIG. 3B, the second DMA engine (243) may perform bidirectional data transfer between the main memory (230) and the L1 cache (241), and may perform bidirectional data transmission between the L2 cache (250) and the L1 cache (241).

For example, the second DMA engine (243) may perform a DMA operation to transmit data in the memory space of the main memory (230) to the memory space in the L1 cache (241). The second DMA engine (243) may transmit data in the memory space of the main memory (230) to the memory space of the L1 cache (241). In addition, for example, the second DMA engine (243) may perform a DMA operation to transmit data in the memory space of the main memory (230) to the memory space of the L1 cache (241). The second DMA engine (243) may transmit data in the memory space of the main memory (230) to the memory space of the L1 cache (241).

In addition, for example, the second DMA engine (243) may perform a DMA operation to transmit data in the memory space of the L2 cache (250) to the memory space of the L1 cache (241). The second DMA engine (243) may transmit data in the memory space of the L2 cache (250) to the memory space of the L1 cache (241). In addition, for example, the second DMA engine (243) may perform a DMA operation to transmit data in the memory space of the L2 cache (250) to the memory space of the L1 cache (241). The second DMA engine (243) may transmit data in the memory space of the L2 cache (250) to the memory space of the L1 cache (241).

Meanwhile, the number of parameters required for the operation to perform the LLM task is very large, from 7 billion to 65 billion. Therefore, due to internal memory constraints of an accelerator performing the operation, it is necessary to divide the LLM task and process it. Furthermore, since the LLM has a structural feature that allows parallel processing through partitioning, a process of processing the LLM using multiple devices may be performed to improve the LLM processing performance.

Here, when processing LLM using multiple devices, if data transmitted from one of the multiple devices is corrupted, an error may be propagated during the process of continuing processing using the result, and a final result derived from the processing LLM may be corrupted. For example, a data error may occur due to an error in device computation, or data may be corrupted during a process of exchanging computation results between devices, i.e., a communication failure may occur.

Specifically, if an error occurs during a process of transmitting data between devices, all subsequent data processing performed based on the data in which the error occurred may fail. For example, if the data transmission ordering is not guaranteed in a communication process between devices, a case may occur where not all data arrives at the time a transmission completion signal (SYNC) is received. Here, cases where the data transmission ordering described above is not guaranteed may include a case where a switch network is configured between devices and does not guarantee the order of transaction transmission, and a case where reordering is performed for optimization when data is transmitted from a device to the outside.

In addition, when a plurality of DMA engines operate simultaneously within a single device performing the LLM operation, if corruption occurs in the data transmitted via DMA operations, all subsequent data processing processes that continue processing using the corrupted data may fail.

Accordingly, the present disclosure proposes a method for detecting whether an error occurs in the data communication process between devices or in the DMA operation that transmits data within a device in an LLM task.

Figure 4:
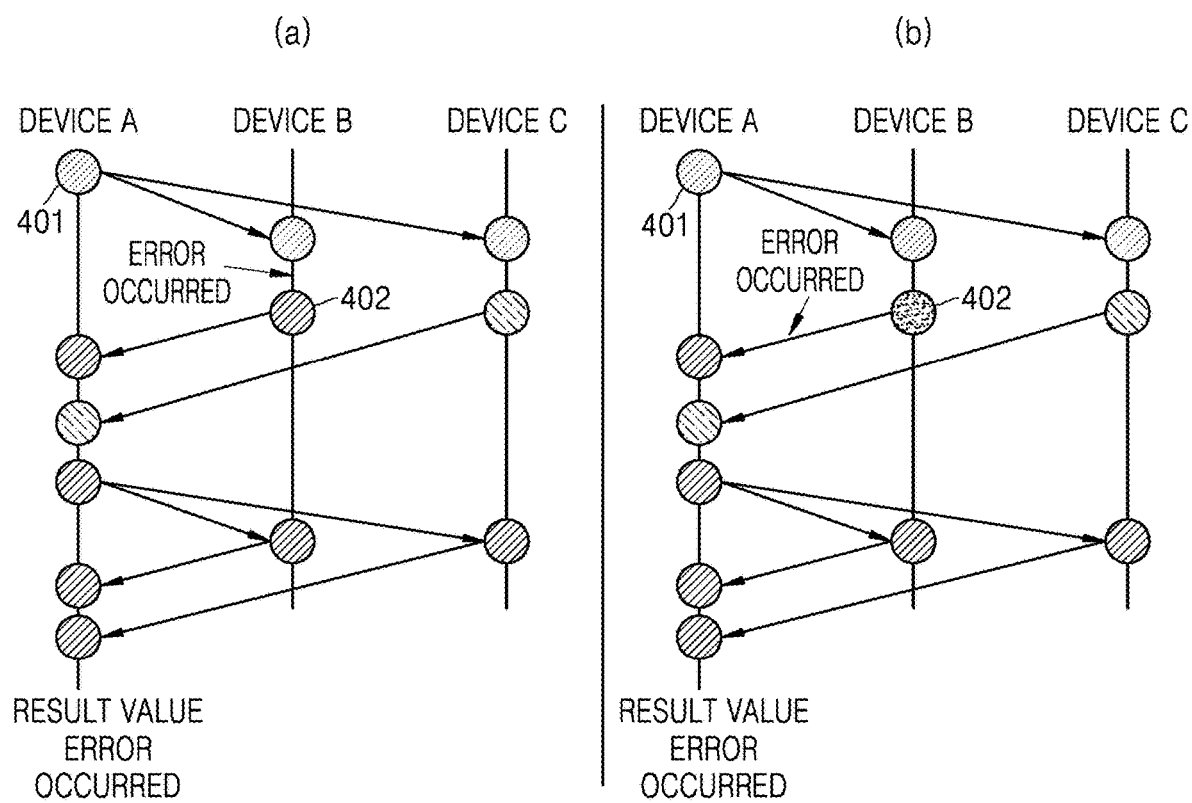
FIG. 4 is a diagram illustrating an example of an error propagating during data communication between devices.

FIG. 4 is a diagram illustrating an example of an error propagating during data communication between devices.

As illustrated in FIG. 4, a communication process for transmitting data between devices A, B, and C, which are devices performing an LLM task, may be performed.

For example, (a) of FIG. 4 represents a case where an error that occurs during data processing in a device is propagated. For example, referring to (a) of FIG. 4, device A may transmit first data (401) to devices B and C, and device B may transmit second data (402) derived by processing the first data (401) to device A. If device B encounters an error while processing the first data (401) and thus derives the second data (402) in which an error occurred, the second data (402) in which the error occurred may be transmitted to device A, and device A may perform a subsequent data processing process based on the second data (402) in which the error occurred, so that a final result value of the LLM task may be output as an error value.

In addition, for example, (b) of FIG. 4 represents a case where an error that occurs during a communication process of transmitting data in a device is propagated. For example, referring to (a) of FIG. 4, device A may transmit first data (401) to devices B and C, and device B may transmit second data (402) derived by processing the first data (401) to device A. If an error occurs during the communication process of transmitting the second data (402) and the second data (402) in which the error occurs is transmitted to device A, device A may perform a subsequent data processing process based on the second data (402) in which the error occurred, and a result value of the LLM task may be finally output as an error value.

In order to detect an error occurring in the data communication process between devices in the LLM task as described above, the present disclosure proposes a method of adding detection data to data transmitted by the device and transmitting the data. Through the proposed method, it is possible to detect a communication process or device in which an error occurs in a process of performing AI task using multiple devices, and thereby obtain an effect of efficiently resolving the data corruption problem. The detection data may also be expressed as a validation packet.

Figure 5:
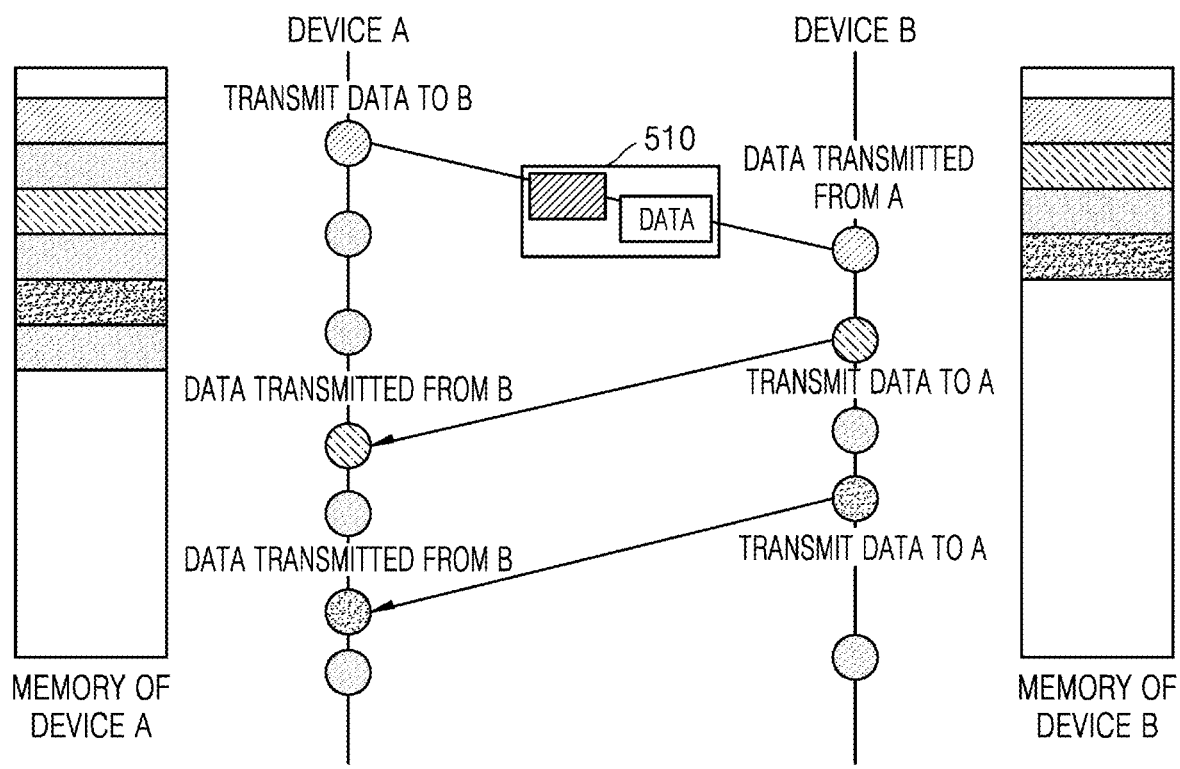
FIG. 5 is a diagram illustrating an embodiment of transmitting transmission data including detection data for error detection during data communication between devices.

FIG. 5 is a diagram illustrating an embodiment of transmitting transmission data including detection data for error detection during data communication between devices.

Referring to FIG. 5, data may be transmitted from device A to device B. In a process of transmitting the data, device A may transmit transmission data (510) to device B, and additionally transmit detection data to device B. For example, the detection data may be represented as a validation packet. For example, as illustrated in FIG. 5, device A may transmit transmission data (510) including data to be transmitted to device B and detection data to device B. The data to be transmitted to device B may be represented as original data. Meanwhile, device A may also transmit a transmission completion signal (Sync) added to the original data and detection data. Device B, which has received the original data and the detection data, may determine whether the original data of the transmission data (510) is a normal state or in an error state based on the detection data.

For example, the detection data may include information for the transmission data. For example, the detection data may include a source device ID, a transfer ID, a destination address, a data size of the transmission data, and/or a hash value of the transmission data. The source device ID included in the detection data for the transmission data transmitted from the device A to the device B may indicate A, which is a device ID of the device A.

In addition, as an example, the hash value of the transmission data may be generated based on the SHA-256 function. For example, the hash value included in the detection data for the transmission data may be a hash value derived by applying the destination address and the data size to the SHA-256 function.

Device B may derive a hash value by applying the destination address and the data size to the SHA-256 function, and may validate whether an error has occurred in the received transmission data based on the derived hash value and the detection data. The hash value derived by the device that received the transmission data may be expressed as a receiving side hash value. For example, device B may compare the derived receiving side hash value with the hash value included in the detection data to determine whether the transmission data is normal or an error has occurred. For example, when the derived receiving side hash value and the hash value included in the detection data are the same, the received transmission data may be normal, and when the derived receiving side hash value and the hash value included in the detection data are not the same, it may be determined that an error has occurred in the received transmission data. In addition, for example, if the derived receiving side hash value and the hash value included in the detection data are not the same, device B may transmit retransmission request information for the data to device A. The retransmission request information may include a transfer ID of the data. When device A receives the retransmission request information, device A may retransmit the transmission data to device B. Device A may select data to retransmit based on the transfer ID of the retransmission request information. The device A may select and retransmit the data based on the transfer ID of the retransmission request information. In addition, for example, a threshold for a number of retransmissions may be set. When device A receives the retransmission request information, device A may determine whether the number of retransmissions performed on the transmission data exceeds the threshold. If the number of retransmissions on the transmission data exceeds the threshold, device A may log error information for the transmission data, and subsequent data processing after the transmission data may be processed as a failure.

In addition, in order to detect an error occurring during a data communication process between devices for the LLM task, the present disclosure proposes a method of adding detection data using a Hamming code to the transmission data transmitted by the device and transmitting the data. The Hamming code may be expressed as an Error Correction Code (ECC).

Figure 6:
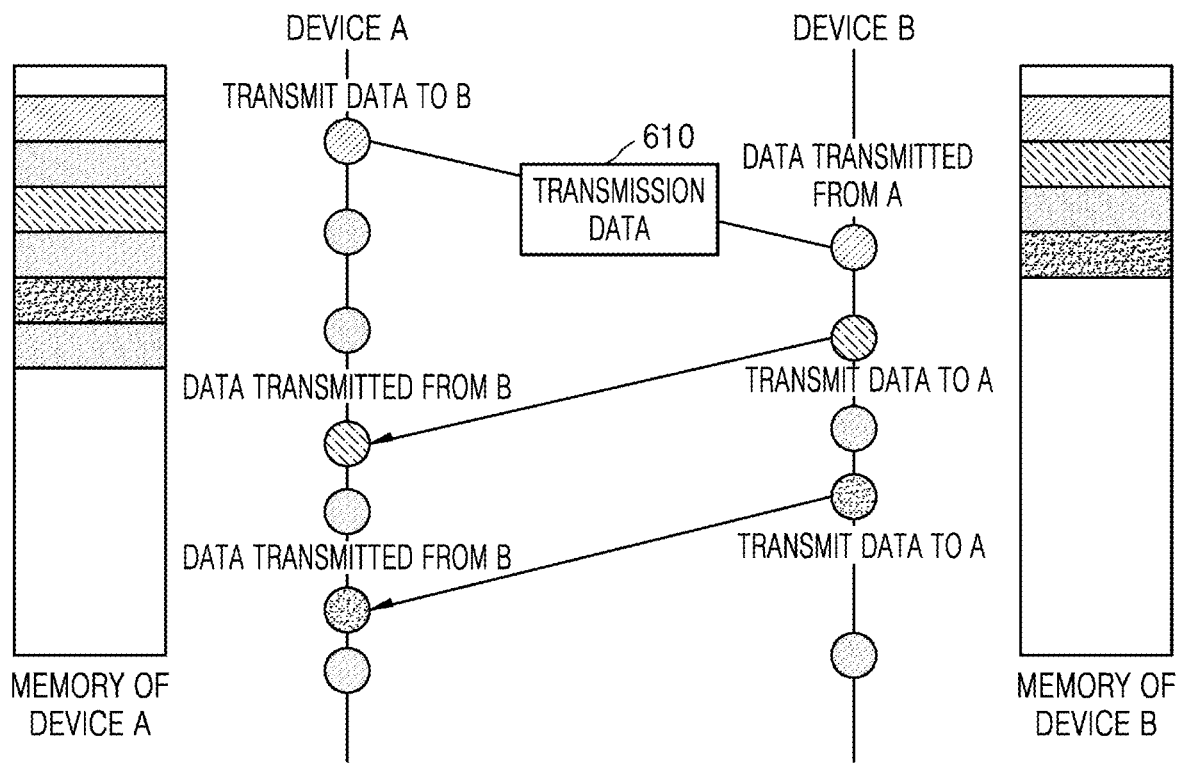
FIG. 6 is a diagram illustrating another embodiment of transmitting transmission data including detection data for error detection during data communication between devices.

FIG. 6 is a diagram illustrating another embodiment of transmitting transmission data including detection data for error detection during data communication between devices.

Device A may add parity data for error detection to transmission data (610) using a Hamming code, and transmit the transmission data (610) to which the parity data is added to device B. The parity data may be represented as the detection data.

For example, when adding the detection data (i.e., parity data) using a Hamming code, the calculated detection data may be added to a nth power position of 2 in the transmission data. Thereafter, errors for the transmission data (610) of up to 2 bits may be validated using the detection data. In addition, an error in the transmission data (610) of 1 bit may be corrected using the detection data.

In addition, a bit amount of the detection data may be derived based on a bit amount of the data to be transmitted (i.e., the original data).

For example, if the bit amount of the original data to be transmitted is d and the bit amount of the detection data is p, the following equation may be satisfied.

$$2^p \geq d+p+1 \qquad \text{[Equation 1]}$$

For example, if the bit amount of the original data is d, the bit amount of the detection data, p, may be derived as the smallest value among values satisfying the equation 1.

For example, the maximum bit amount of original data that may be validated based on 5 bits of detection data may be 26 bits. The user may adjust the bit amount of the detection data. For example, the transmission data (610) consisting of a 31 bit data chunk including 5 bit detection data and 26 bit original data may be transmitted. That is, when 31 bits of transmission data (610) are transmitted, 5 bits out of the total bit amount of 31 bits of the transmission data (610) may be configured as the parity data, and thus, an overhead of 16% may be added.

Figure 7:
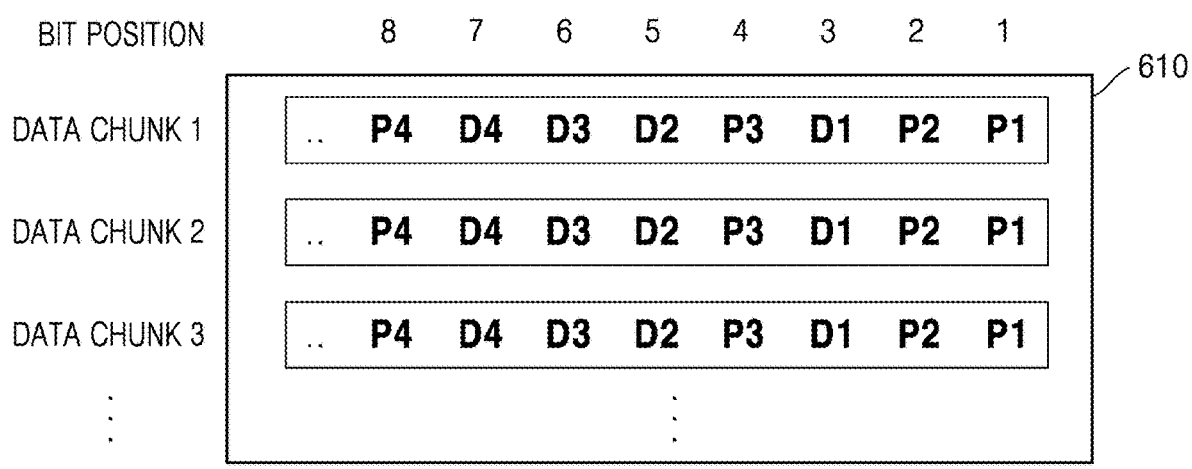
FIG. 7 is a diagram illustrating a transmission data with parity data added for error validation using a Hamming code.

FIG. 7 is a diagram illustrating a transmission data with parity data added for error validation using a Hamming code.

Referring to FIG. 7, a data chunk including original data to be transmitted and parity data may be configured. For example, transmission data configured as a data chunk including original data and parity data may be transmitted. Dn illustrated in FIG. 7 may represent original data to be transmitted, and Pn may represent parity data. As illustrated in FIG. 7, the parity data may be added to a nth power position of 2 in the transmission data. Here, n may be an integer greater than or equal to 0.

For example, an embodiment of configuring transmission data by adding parity data to original data to be transmitted according to a Hamming code may be as follows.

First, an area covered by the parity data Pn may be derived. For example, the area covered by Pn may be a set of bit positions where the value of the nth bit is 1 when representing the bit positions in binary. For example, if 3 bits of parity data are added to 4 bits of original data, the bit positions may be represented in binary as shown in the following table.

TABLE 1

|   | nth bit value | | |
|---|---|---|---|
| R | 3 | 2 | 1 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Here, R may represent a bit position. Referring to the Table 1, since bit positions where a value of the 1st bit is 1 are 1, 3, 5, 7, an area covered by P1 may be 1, 3, 5, 7, since bit positions where a value of the 2nd bit is 1 are 2, 3, 6, 7, the an area covered by P2 may be 2, 3, 6, 7, and since bit positions where a value of the 3rd bit is 1 are 4, 5, 6, 7, an area covered by P3 may be 4, 5, 6, 7.

Thereafter, values of bits located in the derived area covered by Pn may be XOR-operated to derive a parity data value of the Pn. For example, if the original data to be transmitted is 1001, the configured transmission data may be 1 0 0 P3 1 P2 P1. Since the area covered by P1 is 1, 3, 5, 7, values of bits located in the area are P1, 1, 0, 1, and the value 0 derived by performing XOR-operation on 1, 0, 1 may be derived as a value of P1. In addition, since the area covered by P2 is 2, 3, 6, 7, values of bits located in the area are P2, 1, 0, 1, and the value 0 derived by performing XOR-operation on 1, 0, 1 may be derived as a value of P2. In addition, since the area covered by P3 is 4, 5, 6, 7, values of bits located in the area are P3, 0, 0, 1, and the value 1 derived by performing XOR operation on 0, 0, 1 may be derived as a value of P3. Accordingly, by adding the derived parity data to the original data, the transmission data may be configured as 1 0 0 1 1 0 0.

A device receiving the transmission data may determine whether there is an error in the transmission data based on the parity data. For example, a detection value may be derived by performing an XOR operation on bit values of an area covered by parity data Pn. The detection value may be called a syndrome. Here, when a number of the parity data is N, the detection value may be a binary number CN . . . C1. When the detection value is 0, the transmission data may be determined to be normal, and when a value of the detection value expressed in decimal is R, the transmission data may be determined to have an error in bit position R. A device receiving the transmission data may derive Cn by performing an XOR operation on values of an area covered by Pn, and may derive CN . . . C1 as the detection value C.

For example, if the original data is 1001 and the parity data is 1 0 0, the normal transmission data may be 1 0 0 1 1 0 0. Meanwhile, if an error occurs in the transmission data and it is transmitted to the device as 1 0 1 11 0 0 (if an error occurs in bit position 5 where the normal value 0 is changed to 1), since the area covered by P1 is 1, 3, 5, 7, the device may derive 1 as C1 by performing an XOR operation on the bits located in the area, which are 0, 1, 1, 1. And, since the area covered by P2 is 2, 3, 6, 7, the device may derive 0 as C2 by performing an XOR operation on the bits located in the area, which are 0, 1, 0, 1. And, since the area covered by P3 is 4, 5, 6, 7, the device may derive 1 as C3 by performing an XOR operation on the bits located in the area, which are 1, 1, 0, 1. The detection value (i.e., syndrome) C may be C3 C2 C1, i.e., may be derived as 101. Accordingly, since a value of the detection value C expressed in decimal is 5, the device may determine that an error has occurred at bit position 5. The device may detect errors of up to 2 bits.

Thereafter, the device may correct the validated error to derive normal transmission data. For example, the device may correct a 1-bit error to derive normal transmission data. Or, for example, the device may transmit retransmission request information to the device transmitting the transmission data. When the device transmitting the transmission data receives the retransmission request information, the device may retransmit a data chunk in which an error is detected in the transmission data to the device receiving the transmission data. For example, the retransmission request information may include information for the data chunk in which an error is detected and information for a retry count. The information for the data chunk may be index information representing a data chunk in a data chunk list including data chunks of the transmission data. In addition, for example, a threshold for the retry count may be set. When the device transmitting the transmission data receives the retransmission request information, the transmission device may determine whether a number of retries performed on the transmission data exceeds the threshold. When the number of retries for the transmission data exceeds the threshold, the transmission device may process the transmission operation of the transmission data as a transmission failure and log error information for the transmission data. The error information may include the number of retries and/or a degree of transmission failure of the transmission data.

Meanwhile, a process of processing data of the LLM task in parallel using multiple devices may include a map task that processes data in parallel and a reduce task that derives a single result data based on the data processed in parallel.

For example, one device of the plurality of devices may perform the reduce task, and a plurality of devices may perform the map task. a device performing the reduce task may be called a master device, and a device performing the map task may be called a worker device. That is, for example, a process of processing data of an LLM task may be performed based on one master device and a plurality of worker devices, and a communication process between the master device and the plurality of worker devices may be as described below.

Figure 8:
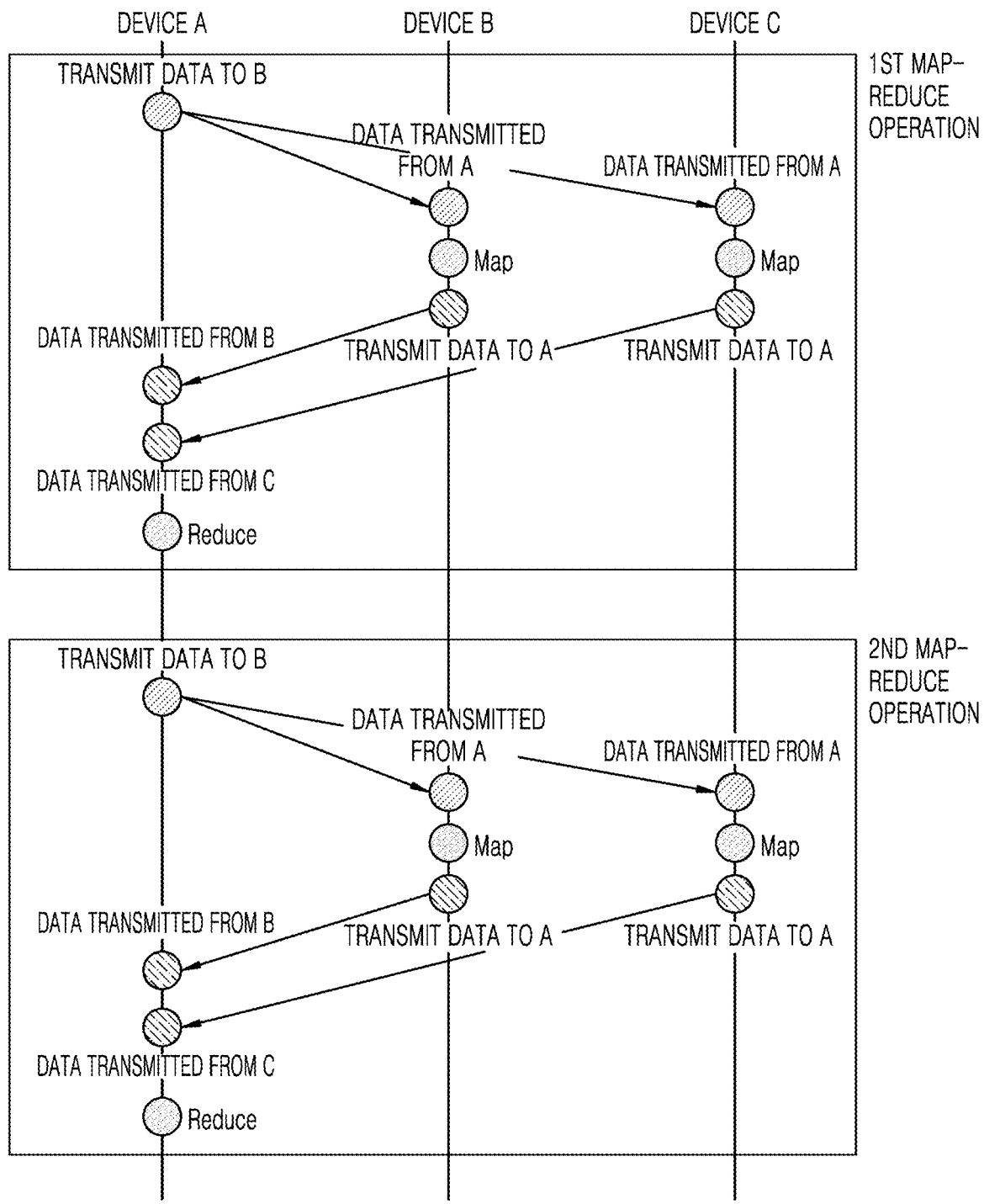
FIG. 8 is a diagram illustrating a data communication process between devices during a process of processing data in parallel using multiple devices.

FIG. 8 is a diagram illustrating a data communication process between devices during a process of processing data in parallel using multiple devices.

Referring to FIG. 8, device A may be a master device performing a reduce task, and device B and device C may be worker devices performing a map task. For example, device A may transmit transmission data to device B and device C, and device B and device C may perform a map task that processes data transmitted from device A in parallel. Data processed in device B and device C may be transmitted to device A, and device A may perform a reduce task that derives one result data based on data processed in parallel in device B and device C.

In addition, the process of processing data in parallel and deriving result data may be performed repeatedly to derive final result data. For example, as illustrated in FIG. 8, device A may transmit a first result data derived based on a first map-reduce operation to device B and device C as transmission data, and device B and device C may perform a map task that processes the data transmitted from device A in parallel. Data processed based on the first result data in device B and device C may be transmitted to device A, and device A may perform a reduce task that derives second result data based on the data processed in parallel at device B and device C.

As described above, the process of processing data for LLM task includes a map task and a reduce task, and tracing all processes to track the occurrence of a communication error may be costly. Therefore, a method of performing error detection by adjusting a tracing target may be considered.

For example, a full trace that traces communication process of devices may be applied. For example, an operation of detecting whether an error has occurred based on detection data may be applied to transmission data transmitted by a master device and transmission data transmitted by a worker device. Through this, it is possible to track the entire map task and reduce task to detect and/or correct which device's communication problems occur. For example, the full trace may be applied when there is a need to detect at a high level whether an error occurs during communication between devices.

As another example, a device selected trace may be applied to trace a communication process of a selected device. For example, a specific device may be selected among devices, and an operation of detecting whether an error has occurred based on detection data may be applied to transmission data transmitted by the selected specific device. In addition, for example, a specific device may be selected among worker devices, and an operation of detecting whether an error has occurred based on detection data may be applied to transmission data transmitted by the selected specific device. When the device selected trace is applied, it is possible to adjust the selection of the worker device to which the operation of detecting whether an error has occurred is applied, thereby avoiding performing the operation of generating and detecting detection data to detect transmission data received from a worker device that is not selected by a master device. The master device may not perform an operation of detecting whether an error has occurred in the transmission data generated by a map task of an unselected worker device, in other words, the master device may not perform an operation of detecting whether an error has occurred in the map task of the unselected worker device. For example, if the map-reduce operation is performed K times, the master device may not perform operations of detecting whether an error has occurred in the map task of the unselected worker device K times.

As another example, a map only trace that traces only a communication process of a worker device among devices may be applied. For example, an operation of detecting whether an error has occurred based on detection data may be applied to transmission data transmitted by a worker device among devices. Through this, only an operation of detecting whether an error has occurred in a map task of a worker device may be performed.

As another example, a reduce only trace that traces only a communication process of a master device among devices may be applied. For example, an operation of detecting whether an error has occurred based on detection data may be applied to transmission data transmitted by a master device among devices. Through this, only an operation of detecting whether an error has occurred in a reduce task of a master device may be performed.

In addition, a plurality of DMA engines may operate simultaneously in a process of processing LLM in the device. When DMA operations are performed in parallel and some of data usage locations of the DMA operations overlap, a final output may be completely different due to characteristics of the AI operation that performs the next operation using the results of the previous operation. In addition, since an error that occurred spreads throughout, it may be difficult to estimate a location where the error first occurred.

Accordingly, the present disclosure proposes a method for detecting whether an error occurs in a DMA operation that transmits data within a device performing AI service operation task including LLM task.

Figure 9:
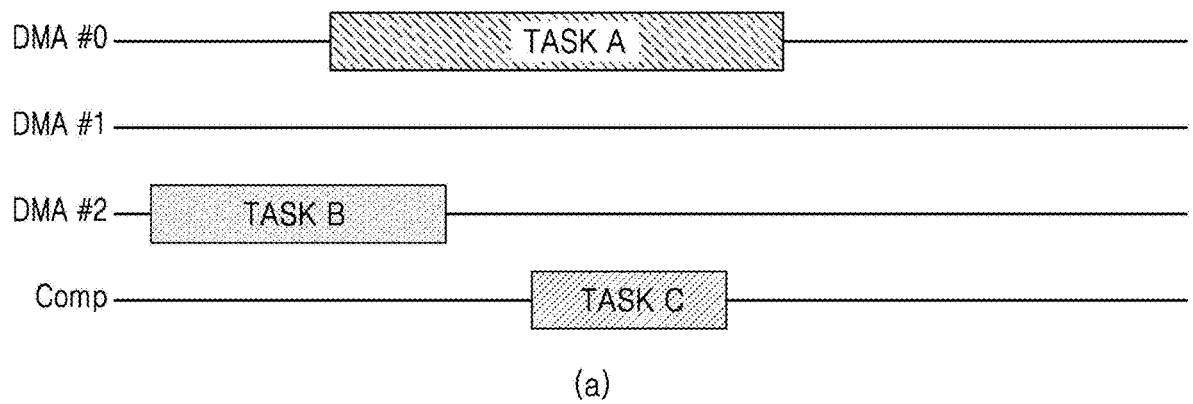
FIG. 9 is a diagram illustrating an embodiment of detecting an error in DMA operations performed in a device based on detection data for error detection.
Figure 9:
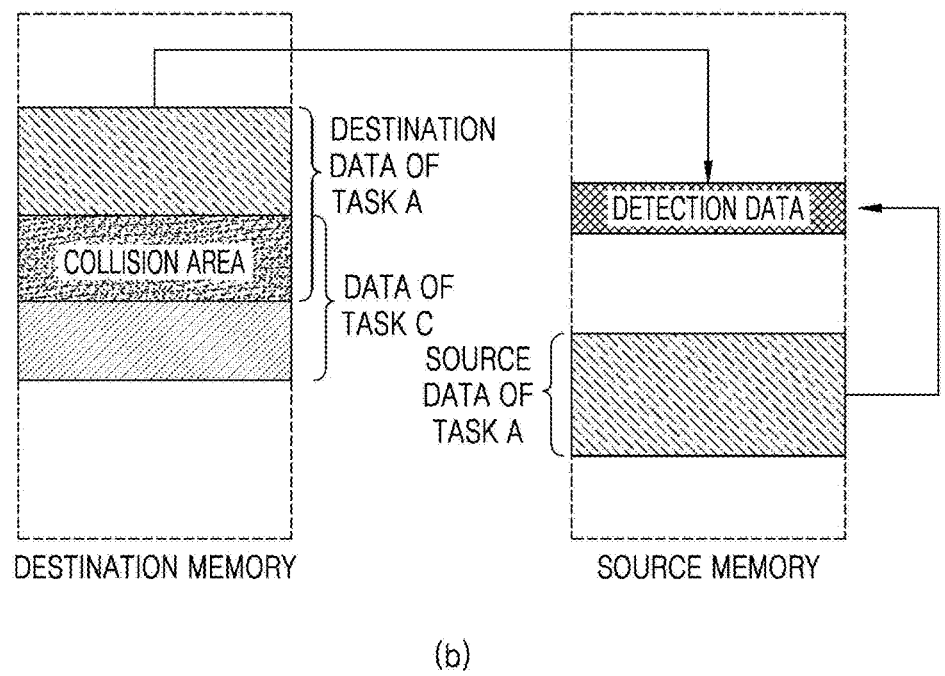

FIG. 9 is a diagram illustrating an embodiment of detecting an error in DMA operations performed in a device based on detection data for error detection.

As illustrated in FIG. 9, a DMA operation for a DMA task may represent an operation of transmitting data of a specific size of a source address in a source memory to a destination address in a destination memory. For example, referring to FIG. 9, a DMA operation for task A may be performed to transmit data from a source memory to a destination memory. For example, the source memory may be DRAM, and the destination memory may be an L2 cache. That is, the DMA operation of task A may be an operation of transmitting data of a source address of the DRAM to a destination address of the L2 cache in a specific size. In addition, referring to FIG. 9, task C may be performed in parallel with task A, and data derived from an operation of task C may be stored in the destination memory, the L2 cache.

Meanwhile, as illustrated in FIG. 9, a storage area of data transmitted to the destination memory by the DMA operation for the task A and a storage area of data stored in the task B may partially overlap, which may cause errors in the data.

The present disclosure proposes a method for determining whether the error occurs using detection data.

Specifically, the CP may derive detection data based on source data of a DMA operation, and store the derived detection data in the source memory. For example, as illustrated in FIG. 9, the CP may derive detection data based on source data of a DMA operation of a task A before starting the DMA operation of the task A, and store the derived detection data in the source memory. The detection data derived based on the source data may be expressed as detection data of the source data.

Thereafter, the DMA operation may be performed so that the source data may be transmitted to a destination address of a destination memory. The CP may derive detection data based on destination data transmitted by the DMA operation (data transmitted to the destination address of the destination memory), and may compare the detection data derived based on the destination data with the detection data derived based on the source data to determine whether an error has occurred in the destination data transmitted by the DMA operation. The detection data derived based on the destination data may be expressed as detection data of the destination data.

For example, after the DMA operation of the task A is terminated, the CP may derive detection data of the destination data of the DMA operation of the task A, and compare the detection data of the source data stored in the source memory with the detection data of the destination data to determine whether an error occurred in the data transmitted by the DMA operation.

For example, when the detection data of the source data and the detection data of the destination data are the same, the CP may determine that an error has not occurred in the destination data. Or, for example, when the detection data of the source data and the detection data of the destination data are not the same, the CP may determine that an error has occurred in the destination data.

For example, the detection data may be detection data including a hash value. For example, the detection data of the source data may be detection data including a hash value derived based on the source data. In addition, for example, the detection data of the destination data may be detection data including a hash value derived based on the destination data.

For example, a hash value of detection data may be generated based on the SHA-256 function. For example, a hash value included in the detection data of the source data may be a hash value derived by applying the destination address and a data size of the source data to the SHA-256 function. In addition, for example, a hash value included in the detection data of the destination data may be a hash value derived by applying the destination address and a data size of the destination data to the SHA-256 function. when the DMA operation is performed normally, the destination address and the data size of the source data and the destination data are the same, so when the detection data of the source data and the detection data of the destination data are the same, the CP may determine that an error has not occurred in the destination data.

In addition, for example, when the detection data of the source data and the detection data of the destination data are not the same, the CP may determine that an error has occurred in the destination data. In this case, the CP may transmit retransmission request information to the DMA engine. When the DMA engine receives the retransmission request information, the DMA operation for transmitting the source data to the destination address of the destination memory may be re-performed. That is, when the DMA engine receives the retransmission request information, the DMA engine may re-perform the DMA operation for transmitting the source data to the destination address of the destination memory.

In addition, for example, a threshold for a number of retries may be set. The CP may determine whether the number of retries performed for the DMA operation for transmitting the source data exceeds the threshold. When the number of retries of the DMA operation for transmitting the source data exceeds the threshold, the CP may process the DMA operation as a transmission failure and log error information for the DMA operation. The error information may include the number of retries and/or a degree of transmission failure of the DMA operation for transmitting the source data.

Alternatively, as an example, the detection data may be parity data generated according to a Hamming code. For example, source data transmitted by the DMA operation may include original data and detection data. For example, the parity data may be added to a nth power position of 2 in the source data. The detection data generated according to the Hamming code may be derived as described above. In addition, for example, the source data may be configured with data chunks including original data and detection data. For example, the CP may determine whether the destination data has an error based on parity data of the destination data transmitted by the DMA operation. The CP may determine whether the destination data has an error in units of the data chunks. For example, the CP may determine whether a data chunk of the destination data has an error based on parity data of the data chunk of the destination data. For example, the CP may derive a detection value based on the parity data. When the detection value is 0, the data chunk of the destination data may be determined to be normal, and when the detection value expressed in decimal is R, which is not 0, it may be determined that an error has occurred in data located at bit position R of the data chunk of the destination data. The CP may detect an error of up to 2 bits.

Thereafter, the CP may correct the detected error to derive normal destination data. For example, the CP may correct data of the data chunk in which an error is detected. For example, the CP may correct a 1 bit error of the data chunk to derive normal destination data. Or, for example, the CP may transmit retransmission request information to the DMA engine. When the DMA engine receives the retransmission request information, the DMA operation for transmitting the source data to the destination address of the destination memory may be re-performed. For example, when the DMA engine receives the retransmission request information, the DMA operation for transmitting a data chunk in which an error is detected in the destination data may be re-performed. For example, the retransmission request information may include information for the data chunk in which an error is detected and information for a retry count. The information for the data chunk may be index information representing a data chunk in a data chunk list including data chunks of the destination data.

In addition, for example, a threshold for the number of retries may be set. For example, the CP may determine whether the number of retries performed for the DMA operation for transmitting the source data exceeds the threshold. When the number of retries performed for the DMA operation exceeds the threshold, the CP may process the DMA operation as a transmission failure and log error information for the DMA operation. The error information may include the number of retries and/or a degree of transmission failure of the DMA operation.

Figure 10:
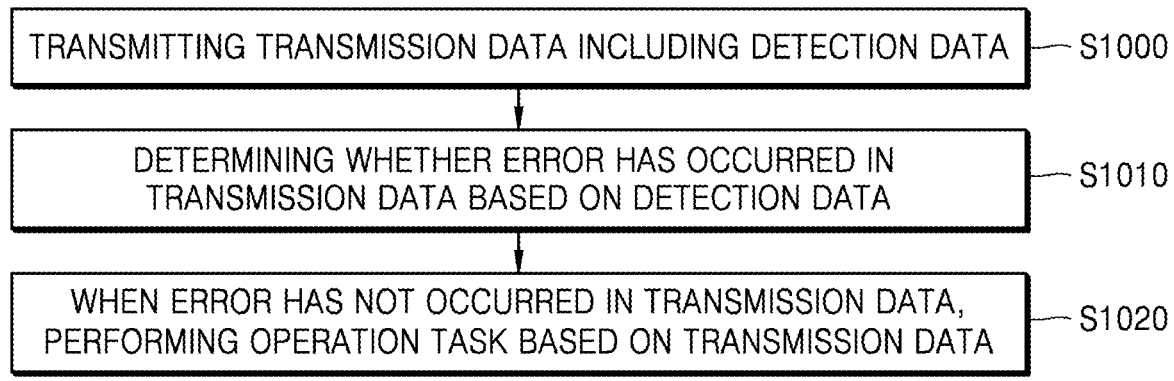
FIG. 10 is a flowchart for explaining in detail a data processing method of a data processing system including a plurality of devices for AI task according to an embodiment of the present disclosure.

FIG. 10 is a flowchart for explaining in detail a data processing method of a data processing system including a plurality of devices for AI task according to an embodiment of the present disclosure.

A first device transmits transmission data including detection data to a second device (S1000). For example, the transmission data may include data to be transmitted to the second device and the detection data. The data to be transmitted may be referred to as original data. That is, the transmission data may include original data and the detection data.

For example, the detection data may be detection data including a hash value. For example, the detection data may include the hash value, a source device ID, a transfer ID, a destination address, and/or a data size. The source device ID may represent an ID of the first device, the transfer ID may represent an ID of a transfer transmitting the transmission data, the destination address may represent a memory address of the second device to which the transmission data is transmitted, and the data size may represent a data size of the transmission data.

For example, the hash value may be derived based on SHA-256 function. For example, the hash value may be a value derived by applying the destination address and the data size to the SHA-256 function.

Alternatively, for example, the detection data may be parity data derived based on a Hamming code. The detection data may be located at a nth power position of 2 in the transmission data. For example, the transmission data may be configured with a data chunk including data to be transmitted to the second device and the detection data. That is, the transmission data may be configured with a data chunk including original data and the detection data. The detection data may be located at a nth power position of 2 in a data chunk of the transmission data. Here, n may be an integer greater than or equal to 0. For example, a Nth parity data PN may be derived based on bit values of an area covered by the PN. For example, the Nth parity data PN may be derived by performing an XOR operation on bit values of an area covered by the PN.

The second device determines whether an error has occurred in the transmission data based on the detection data (S1010). For example, whether an error has occurred in the transmission data may be determined based on the detection data.

For example, the second device may derive detection data based on the transmission data, and may determine whether an error has occurred in the transmission data based on the derived detection data and the detection data included in the transmission data. The detection data derived by the second device may be referred to as receiving side detection data. That is, the second device may derive receiving side detection data based on the transmission data, and may determine whether an error has occurred in the transmission data based on the receiving side detection data and the detection data included in the transmission data.

For example, the detection data may be detection data including a hash value. For example, the second device may derive a receiving side hash value based on the transmission data, and may compare the receiving side hash value with a hash value of the detection data to determine whether an error has occurred in the transmission data. For example, the receiving side hash value may be derived based on the destination address and the data size. The receiving side hash value may be derived by applying the destination address and the data size to a SHA-256 function.

For example, when the receiving side hash value and the hash value of the detection data are the same, it may be determined that an error has not occurred in the transmission data.

Or, for example, when the receiving side hash value and the hash value of the detection data are not the same, it may be determined that an error has occurred in the transmission data.

For example, when the receiving side hash value and the hash value of the detection data are not the same, the second device may transmit retransmission request information for the transmission data to the first device. For example, the retransmission request information may include a transfer ID of the transmission data. For example, when the first device receives the retransmission request information, the first device may retransmit the transmission data to the second device. The retransmitted transmission data may be derived based on the transfer ID included in the retransmission request information. Or, for example, when the first device receives the retransmission request information, the first device may determine whether a number of retransmissions performed for the transmission data exceeds a threshold. For example, when the number of retransmissions for the transmission data does not exceed the threshold, the first device may retransmit the transmission data to the second device, and when the number of retransmissions for the transmission data exceeds the threshold, the first device may not retransmit the transmission data and may log error information for the transmission data. The error information may include the number of retries of the transmission data and/or a degree of transmission failure of the transmission data. In this case, data processing for the transmission data may be processed as failed. An operation task for the transmission data may be processed as failed. The threshold for the number of retransmissions of the transmission data may be preset.

Alternatively, as an example, the detection data may be parity data derived based on a Hamming code. For example, the second device may derive a detection value based on the parity data, and determine whether an error has occurred in the transmission data based on the detection value.

For example, whether an error has occurred in the transmission data may be determined in units of data chunks. For example, the transmission data may be configured with a data chunk including the original data and the detection data. The second device may derive a detection value based on parity data of the data chunk of the transmission data, and may determine whether an error has occurred in the data chunk of the transmission data based on the detection value.

For example, the detection value may be derived based on bit values of an area covered by the parity data. For example, the detection value may be derived by performing an XOR operation on the bit values of the area covered by the parity data. Here, the detection value may be binary $CN \ldots C1$. The detection value $Cn$ may be derived by performing the XOR operation on the bit values of the area covered by the parity data $Pn$.

For example, when the detection value is 0, it may be determined that the error has not occurred in the transmission data.

Or, for example, when the detection value is not 0, it may be determined that the error has occurred in the transmission data. For example, when the detection value expressed in decimal is R, it may be determined that the error has occurred in a bit position R of the data chunk. A device that has received the transmission data may derive $Cn$ by performing the XOR operation on the values of the area covered by $Pn$, and may derive $Cn \ldots C1$ as the detection value C.

For example, when the detection value is not 0, the second device may correct an error in the data chunk of the transmission data. Specifically, for example, when the detection value expressed in decimal is R, the second device may correct data located at bit position R of the data chunk. The second device may perform subsequent data processing based on the transmission data including the data chunk in which the error is corrected.

Or, for example, when the detection value is not 0, the second device may transmit retransmission request information for the transmission data to the first device. Or, for example, when the detection value is not 0, the second device may transmit retransmission request information for the data chunk of the transmission data to the first device. For example, the retransmission request information may include information for the data chunk in which an error is detected and/or information for a retry count. The information for the data chunk may be index information representing the data chunk in a data chunk list of the transmission data. For example, when the first device receives the retransmission request information, the first device may retransmit a data chunk of the transmission data to the second device. The data chunk of the retransmitted transmission data may be derived based on the information for the data chunk included in the retransmission request information. Alternatively, for example, when the first device receives the retransmission request information, the first device may determine whether a number of retransmissions performed for the transmission data exceeds a threshold. For example, when the number of retransmissions for the transmission data does not exceed the threshold, the first device may retransmit the data chunk of the transmission data to the second device, and when the number of retransmissions for the transmission data exceeds the threshold, the first device may not retransmit the data chunk of the transmission data, and may log error information for the transmission data. The error information may include the number of retries and/or a degree of transmission failure of the transmission data. In this case, data processing for the transmission data may be processed as a failure. An operation task for the transmission data may be processed as a failure. The threshold for the number of retransmissions for the transmission data may be preset.

Meanwhile, for example, the determination of whether an error has occurred in the transmission data may be performed based on a type of the first device. For example, the plurality of devices may include a master device that performs a reduce task and a worker device that performs a map task. For example, when the first device is the master device, the determination of whether an error has occurred in the transmission data may be performed. Or, for example, when the first device is the worker device, the determination of whether an error has occurred in the transmission data may be performed. Or, for example, when the first device is a selected specific device, the determination of whether an error has occurred in the transmission data may be performed. The specific device on which the determination of whether an error has occurred in the transmission data is performed may be pre-selected.

When an error has not occurred in the transmission data, the second device performs an operation task based on the transmission data (S1020). The second device may perform subsequent data processing based on the transmission data. For example, the second device may perform subsequent data processing based on the transmission data. The second device may perform an operation task based on the transmission data and transmit a result derived from the operation task to another device.

Figure 11:
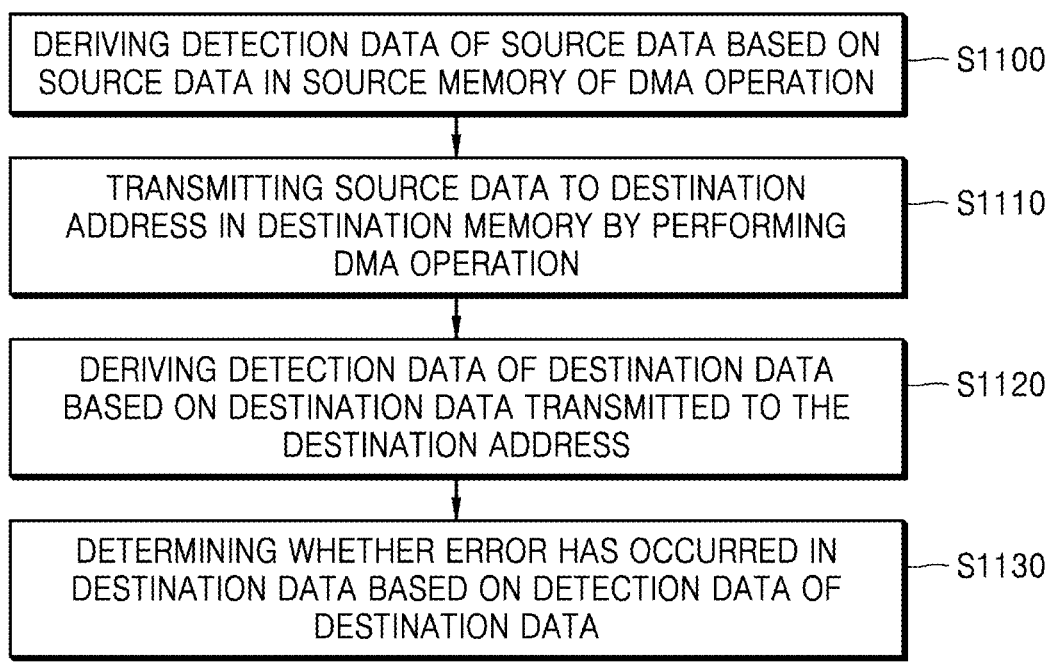
FIG. 11 is a flowchart explaining in detail a DMA method of an electronic device for AI task according to an embodiment of the present disclosure.

FIG. 11 is a flowchart explaining in detail a DMA method of an electronic device for AI task according to an embodiment of the present disclosure.

A CP derives detection data of source data based on source data in a source memory of a DMA operation (S1100). For example, the electronic device may include a command processor (CP) that operates firmware for a direct memory access (DMA) operation and a DMA engine that performs the DMA operation between a source memory and a destination memory.

The DMA engine may be a DMA engine that is a separate device from a processing core of the electronic device. That is, the DMA engine may be the first DMA engine described above. Or, for example, the DMA engine may be a DMA engine included in the processing core of the electronic device. That is, the DMA engine may be the second DMA engine or the third DMA engine described above. The source memory may be a main memory, a L1 cache, or a L2 cache of the electronic device, and the destination memory may be a main memory, a L1 cache, or a L2 cache of the electronic device. In addition, for example, the electronic device may further include a DMA engine other than the DMA engine.

For example, a DMA operation may represent an operation of transmitting the source data in the source memory to a destination address in the destination memory. Data transmitted to the destination address by the DMA operation may be represented as destination data.

For example, the detection data of the source data may be detection data including a hash value. For example, the detection data of the source data may be detection data including a hash value and may be stored in the source memory. For example, the detection data may include the hash value, a transfer ID, a destination address, and/or a data size. The transfer ID may represent an ID of a transfer of the DMA operation that transfers the transmission data, the destination address may represent an address in the destination memory to which the source data is transmitted, and the data size may represent a data size of the source data.

For example, the hash value may be derived based on a SHA-256 function. For example, the hash value may be a value derived by applying the destination address and the data size to the SHA-256 function.

Alternatively, for example, the detection data of the source data may be parity data derived based on a Hamming code. The detection data may be located at a nth power position of 2 in the source data. For example, the source data may be configured with a data chunk including data to be transmitted to the destination memory and the detection data. That is, the source data may be configured with a data chunk including original data and the detection data. The detection data may be located at a nth power position of 2 in a data chunk of the source data. Here, n may be an integer greater than or equal to 0. For example, Nth parity data PN may be derived based on bit values of an area covered by the PN. For example, the Nth parity data PN may be derived by performing an XOR operation on the bit values of the area covered by the PN.

The DMA engine transmits the source data to the destination address in the destination memory by performing the DMA operation (S1110). For example, the DMA engine may transmit a transaction of the DMA operation from the source memory to the destination memory. The transaction may be a read transaction or a write transaction.

The CP derives detection data of the destination data based on the destination data transmitted to the destination address (S1120).

For example, the detection data of the destination data may be detection data including a hash value. For example, the hash value may be derived based on a SHA-256 function. For example, the hash value may be a value derived by applying the destination address and the data size of the destination data to the SHA-256 function.

Alternatively, for example, the detection data of the destination data may be parity data derived based on a Hamming code. The detection data may be located at a nth power position of 2 in the destination data. For example, the destination data may be configured with a data chunk including original data and the detection data. The detection data may be located at a nth power position of 2 in the data chunk of the destination data. Here, n may be an integer greater than or equal to 0.

The CP determines whether an error has occurred in the destination data based on the detection data of the destination data (S1130).

For example, the detection data of the source data may be detection data including a hash value of the source data, and the detection data of the destination data may be detection data including a hash value of the destination data. For example, the CP may derive a hash value of the destination data based on the destination data, and may determine whether an error has occurred in the destination data by comparing the hash value of the source data and the hash value of the destination data. For example, the hash value of the destination data may be derived based on the destination address and the data size of the destination data. The hash value of the destination data may be derived by applying the destination address and the data size of the destination data to a SHA-256 function.

For example, when the hash value of the destination data and the hash value of the source data are the same, it may be determined that the error has not occurred in the destination data.

Or, for example, when the hash value of the destination data and the hash value of the source data are not the same, it may be determined that an error has occurred in the destination data.

For example, when the hash value of the destination data and the hash value of the source data are not the same, the CP may transmit retransmission request information of the DMA operation to the DMA engine. For example, the retransmission request information may include a transfer ID of the DMA operation. For example, when the DMA engine receives the retransmission request information, the DMA engine may reperform the DMA operation. The source data of the DMA operation to be retransmitted may be derived based on the transfer ID included in the retransmission request information. Or, for example, when the hash value of the destination data and the hash value of the source data are not the same, the CP may determine whether a number of retransmissions performed for the DMA operation exceeds a threshold. For example, when the number of retransmissions for the DMA operation does not exceed the threshold, the CP may transmit retransmission request information for the DMA operation to the DMA engine, and when the number of retransmissions for the DMA operation exceeds the threshold, the CP may not transmit the retransmission request information and may log error information for the DMA operation. The error information may include the number of retries of the DMA operation and/or a degree of transmission failure of the destination data. In this case, data processing for the DMA operation may be processed as failed. An operation task for the DMA operation may be processed as failed. The threshold for the number of retransmissions of the DMA operation may be preset.

Alternatively, as an example, the detection data may be parity data derived based on a Hamming code. For example, the CP may derive a detection value based on the parity data, and may determine whether an error has occurred in the destination data based on the detection value.

For example, whether an error has occurred in the destination data may be determined in units of data chunks. For example, the destination data may be configured with a data chunk including the original data and the detection data. The CP may derive a detection value based on parity data of the data chunk of the destination data, and may determine whether an error has occurred in the data chunk of the destination data based on the detection value.

For example, the detection value may be derived based on bit values of an area covered by the parity data. For example, the detection value may be derived by performing an XOR operation on the bit values of the area covered by the parity data. Here, the detection value may be binary CN . . . C1. The detection value Cn may be derived by performing the XOR operation on the bit values of the area covered by the parity data Pn.

For example, when the detection value is 0, it may be determined that an error has not occurred in the destination data.

Or, for example, when the detection value is not 0, it may be determined that the error has occurred in the destination data. For example, when the detection value expressed in decimal is R, it may be determined that the error has occurred in a bit position R of the data chunk. The CP may derive Cn by performing the XOR operation on the values of the area covered by Pn, and may derive Cn . . . C1 as the detection value C.

For example, when the detection value is not 0, the CP may correct an error in the data chunk of the destination data. Specifically, for example, when the detection value expressed in decimal is R, the CP may correct data located at bit position R of the data chunk. The CP may perform subsequent data processing based on the destination data including the data chunk in which the error is corrected.

Or, for example, when the detection value is not 0, the CP may transmit retransmission request information for the DMA operation to the DMA engine. Or, for example, when the detection value is not 0, the CP may transmit retransmission request information for the data chunk of the destination data to the DMA engine. For example, the retransmission request information may include information for the data chunk in which an error is detected and/or information for a retry count. The information for the data chunk may be index information representing the data chunk in a data chunk list of the destination data. For example, when the DMA engine receives the retransmission request information, the DMA engine may retransmit the data chunk of the destination data to the second device. The data chunk of the retransmitted destination data may be derived based on the information for the data chunk included in the retransmission request information. Alternatively, for example, when the detection value is not 0, the first device may determine whether a number of retransmissions performed for the DMA operation exceeds a threshold.

For example, when the number of retransmissions for the DMA operation does not exceed the threshold, the CP may transmit retransmission request information of the DMA operation to the DMA engine, and when the number of retransmissions for the DMA operation exceeds the threshold, the CP may not transmit the retransmission request information of the DMA operation, and may log error information for the DMA operation. The error information may include the number of retries of the DMA operation and/or a degree of transmission failure of the destination data. In this case, data processing for the DMA operation may be processed as a failure. An operation task for the DMA operation may be processed as a failure. The threshold for the number of retransmissions of the DMA operation may be preset.

Meanwhile, for example, the determination of whether an error has occurred in the destination data may be performed based on a type of the DMA operation. When the DMA operation is a selected specific DMA operation, the determination of whether an error has occurred in the destination data may be performed. The DMA operation in which the determination of whether an error has occurred in the destination data is performed may be pre-selected. Or, for example, the determination of whether an error has occurred in the destination data may be performed based on a transaction type of the DMA operation. When the transaction type of the DMA operation is a selected specific transaction, the determination of whether an error has occurred in the destination data may be performed. The specific transaction of the DMA operation in which the determination of whether an error has occurred in the destination data is performed may be pre-selected.

The data processing method and electronic device in an AI task system including a plurality of devices for AI tasks according to the embodiments described above may accurately detect a communication point or device where an error has occurred in a process of transmitting data for AI tasks, thereby obtaining an effect of efficiently resolving a data corruption problem.

In addition, by detecting a communication point or device where an error has occurred in the process of transmitting data, the communication point or device where an error has occurred in the AI task system may be replaced or corrected, thereby improving an efficiency of fault diagnosis of the AI task system for AI tasks.

In addition, by correcting transmission data in which an error has occurred, data corruption may be prevented, thereby improving the stability of data processing for AI tasks.

In addition, it is possible to detect an operation or device in which an error has occurred in DMA operation within a device for AI tasks, thereby improving the stability and maintenance efficiency of the device.

Although the present disclosure described above has been described with reference to the embodiments illustrated in the drawings, these are merely exemplary, and those skilled in the art will understand that various modifications and variations of the embodiments are possible. That is, the scope of the present disclosure is not limited to the above-described embodiments, and various modifications and improvements made by those skilled in the art using the basic concept of the embodiments defined in the following claims also included in the scope of the embodiments. Therefore, the scope of the present disclosure is defined by the technical spirit of the appended claims.

What is claimed is:

1. A data processing method using a plurality of devices for Artificial Intelligence (AI) task, the method comprising:
   transmitting, by a first device, transmission data including detection data to a second device;

determining, by the second device, whether an error has occurred in the transmission data based on the detection data; and when the error has not occurred in the transmission data, performing, by the second device, an operation task based on the transmission data, wherein receiving side detection data is derived based on the transmission data, and whether the error has occurred in the transmission data is determined based on the receiving side detection data and the detection data included in the transmission data, wherein the plurality of devices include a master device that performs a reduce task and a worker device that performs a map task, and wherein the determination of whether the error has occurred in the transmission data is performed based on whether the second device is the master device or the worker device.

2. The method of claim 1, wherein the detection data includes information for a hash value, a source device ID, a transfer ID, a destination address, and a data size.

3. The method of claim 2, wherein a receiving side hash value of the receiving side detection data is derived based on the destination address and data size, and wherein the receiving side hash value is compared with the hash value of the detection data to determine whether the error has occurred in the transmission data.

4. The method of claim 3, wherein when the receiving side hash value and the hash value of the detection data are the same, it is determined that the error has not occurred in the transmission data, and wherein when the receiving side hash value and the hash value of the detection data are not the same, it is determined that the error has occurred in the transmission data.

5. The method of claim 3, wherein the method further comprises:

when the receiving side hash value and the hash value of the detection data are not the same, transmitting, by the second device, retransmission request information for the transmission data to the first device, and wherein the retransmission request information includes the transfer ID of the transmission data.

6. The method of claim 5, wherein the method further comprises:

when the first device receives the retransmission request information, determining, by the first device, whether a number of retransmissions performed on the transmission data exceeds a threshold value; and logging, by the first device, error information for the transmission data when the number of retransmissions on the transmission data exceeds the threshold value.

7. The method of claim 1, wherein the detection data is parity data derived based on a Hamming code, and wherein the transmission data is configured with a data chunk including original data and the detection data.

8. The method of claim 7, wherein a detection value is derived based on the parity data, and whether an error has occurred in the data chunk of the transmission data is determined based on the detection value.

9. The method of claim 8, wherein when the detection value is 0, it is determined that the error has not occurred in the transmission data, and wherein when the detection value is not 0, it is determined that the error has occurred in the data chunk of the transmission data.

10. The method of claim 9, wherein the method further comprises:

when the detection value is not 0, correcting, by the second device, the error in the data chunk of the transmission data.

11. The method of claim 9, wherein the method further comprises:

when the detection value is not 0, transmitting, by the second device, retransmission request information for the data chunk of the transmission data to the first device, wherein the retransmission request information includes information for the data chunk of the transmission data, and wherein the information for the data chunk is index information representing the data chunk in a data chunk list of the transmission data.

12. The method of claim 1, wherein the reduce task is a task that derives a result data based on data processed in parallel in a plurality of worker devices, wherein the map task is a task that processes data transmitted from the master device in parallel.

13. The method of claim 9, wherein the method further comprises:

when the detection value is R and not 0, correcting, by the second device, data located at bit position R in the data chunk of the transmission data.

14. The method of claim 12, wherein the determination of whether the error has occurred in the transmission data is performed based on whether the second device is a preselected specific device.

15. A direct memory access (DMA) method of an electronic device for Artificial Intelligence (AI) task, the method comprising:

deriving detection data of source data based on the source data in a source memory of a DMA operation;

transferring the source data to a destination address in a destination memory by performing the DMA operation;

deriving detection data of destination data based on the destination data transmitted to the destination address; and determining whether an error has occurred in the destination data based on the detection data of the destination data, wherein a transaction type of the DMA operation is a read transaction or a write transaction, wherein the determination of whether the error has occurred in the destination data is performed based on whether the DMA operation is the read transaction or the write transaction.

16. The method of claim 15, wherein the detection data of the source data includes a hash value of the source data, wherein a hash value of the detection data of the destination data is derived based on the destination address and the data size of the destination data, and wherein the hash value of the source data and the hash value of the destination data are compared to determine whether the error has occurred in the destination data.

17. The method of claim 16, wherein when the hash value of the destination data and the hash value of the source data are the same, it is determined that the error has not occurred in the destination data, and wherein when the hash value of the destination data and the hash value of the source data are not the same, it is determined that the error has occurred in the destination data.

18. The method of claim 15, wherein the destination data is configured with a data chunk including original data and the detection data,
 wherein the detection data of the data chunk is parity data, and
 wherein the determining whether the error has occurred in the destination data comprises:
 deriving a detection value based on the parity data of the data chunk; and
 determining whether an error has occurred in the data chunk of the destination data based on the detection value.

19. The method of claim 18, wherein the determining whether the error has occurred in the destination data further comprises:
 when the detection value is R and not 0, correcting data located at bit position R in the data chunk of the destination data.

20. The method of claim 18, wherein the determining whether the error has occurred in the destination data further comprises:
 when the detection value is not 0, transmitting retransmission request information for the data chunk of the destination data,
 wherein the retransmission request information includes information for the data chunk of the destination data.

\* \* \* \* \*